(No Model.)

W. A. EDDY.
JOINT FOR THE CORNERS OF BOXES, FRAMES, AND LIKE STRUCTURES.

No. 369,927. Patented Sept. 13, 1887.

WITNESSES

INVENTOR
Walton A. Eddy.
J. Tarbell
Attorney

UNITED STATES PATENT OFFICE.

WALTON ALMY EDDY, OF RANDOLPH, NEW YORK.

JOINT FOR THE CORNERS OF BOXES, FRAMES, AND LIKE STRUCTURES.

SPECIFICATION forming part of Letters Patent No. 369,927, dated September 13, 1887.

Application filed March 2, 1887. Serial No. 229,418. (No model.)

*To all whom it may concern:*

Be it known that I, WALTON ALMY EDDY, a citizen of the United States, residing at Randolph, in the county of Cattaraugus and State of New York, have invented certain new and useful Improvements in Joints for the Corners of Boxes, Frames, and like Structures; and I do hereby declare the following to be a full, clear, and exact description of the invention, such as will enable others skilled in the art to which it appertains to make and use the same.

This invention relates to improvements in the construction of joints for the corners of boxes, frames, and like structures.

It consists in a novel construction whereby a tight joint is obtained without necessitating the usual care in the preparation of the same.

It further consists in a novel construction whereby great strength is obtained; and it further consists in a novel construction whereby time in the joining is saved.

Figure 1:
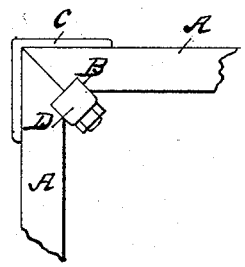
Figure 2:
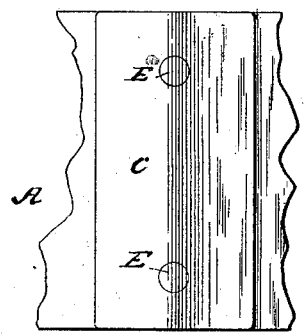
Figure 3:
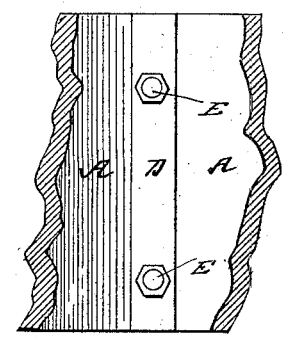
Figure 4:
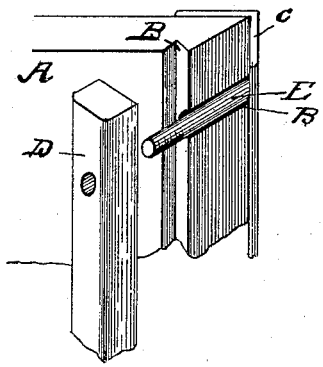
Figure 5:
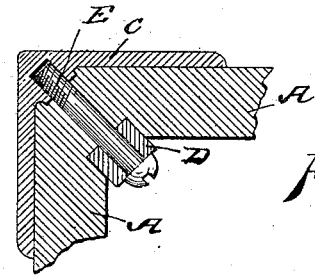
Figure 6:
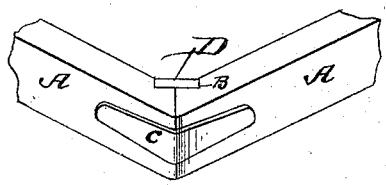

In the drawings, Figure 1 is a plan view of the invention as applied to heavy structures. Figs. 2 and 3 are front and rear elevations of the same. Fig. 4 is a perspective view of one of the sides forming a corner and the clamping device separated and in position for joining. Fig. 5 is a section through the corner, showing an alternative form of the invention. Fig. 6 is a perspective view of the outside of the corner of a frame having the invention applied.

The letter A designates the pieces to be joined. These pieces are mitered to form the desired angle when joined. An angular groove, B, is then formed in the said sides next to the inner angle of the said miter, so that when the said sides are placed together with their mitered ends abutting each other, the said grooves combined will form a square groove, substantially as shown. When thus placed together, the outer corner is placed in the angle-iron C, and the wooden strip D, corresponding to the groove formed by the grooves B, is placed therein. The said angle-iron is provided with bolt-holes at the corner, which are used as guides for corresponding holes, B', driven through the sides A at the joint and through the strip D. When the sides are thus prepared and the strips D fitted in the grooves B, the threaded bolts E are passed through the said perforations and nuts screwed upon them, substantially as shown. The joint is tightened by screwing the said nuts firmly down upon the strip D, which, resting upon the adjoining shoulders of the grooves B and being thrust by the said nuts toward the angle of the iron C, presses the said sides A together into the said angle.

The joint shown in Fig. 5 of drawings is one alternative form of construction, wherein the headed bolts E are dispensed with and screws substituted in their places, driven from the inner corner of the joint and engaging a female thread provided in the angle of the iron C.

What I claim is—

In a joint for the corners of boxes, frames, and like structures, the combination of the sides joined, said sides mitered to form the desired angle, grooves cut in the said sides next the inner edges of the mitered ends, an angle-plate fitting the outer angle formed by the joined ends of the said sides, a bolt attached to the said angle-plate and extending between the said mitered ends, a plate fitting said grooves in said sides and perforated to receive the said bolt, and a nut engaging the end of the said bolt, substantially as set forth, whereby when the said nut is screwed upon the said bolt the angle-plate and the plate resting in the said grooves are drawn together.

In testimony whereof I affix my signature in presence of two witnesses.

WALTON ALMY EDDY.

Witnesses:
JNO. E. TURNER,
B. A. BARTLETT.